(12) United States Patent
Yasrebi et al.

(10) Patent No.: US 8,260,745 B2
(45) Date of Patent: *Sep. 4, 2012

(54) METHOD AND SYSTEM FOR MANAGING MULTIPLE INSTANCE SUBSCRIBER RECORDS IN UNIFIED MESSAGING SYSTEMS

(75) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 862 days.

This patent is subject to a terminal disclaimer.

(21) Appl. No.: 12/335,052

(22) Filed: Dec. 15, 2008

(65) Prior Publication Data
US 2010/0153461 A1   Jun. 17, 2010

(51) Int. Cl.
*G06F 17/30* (2006.01)

(52) U.S. Cl. .......... 707/639; 707/649; 707/802

(58) Field of Classification Search .......... 707/639
See application file for complete search history.

(56) References Cited

U.S. PATENT DOCUMENTS

| | | | |
|---|---|---|---|
| 4,837,798 A | 6/1989 | Cohen et al. | |
| 6,567,774 B1 * | 5/2003 | Lee et al. | 703/23 |
| 6,721,398 B1 | 4/2004 | Pitcher | |
| 7,085,785 B2 * | 8/2006 | Sawdon et al. | 1/1 |
| 7,224,775 B1 * | 5/2007 | Shaffer et al. | 379/88.16 |
| 7,260,607 B2 | 8/2007 | Aktas et al. | |
| 7,272,214 B2 * | 9/2007 | Didcock et al. | 379/88.25 |
| 7,349,528 B2 | 3/2008 | Schmidt, Jr. et al. | |
| 7,433,925 B1 | 10/2008 | Shankar et al. | |
| 7,685,169 B2 * | 3/2010 | Hitz et al. | 707/999.201 |
| 7,693,267 B2 * | 4/2010 | Howell et al. | 379/88.14 |
| 2002/0178146 A1 * | 11/2002 | Akella et al. | 707/2 |
| 2003/0088441 A1 * | 5/2003 | McNerney | 705/3 |
| 2004/0122835 A1 * | 6/2004 | McKibben et al. | 707/100 |
| 2006/0013368 A1 | 1/2006 | LaBaw | |

* cited by examiner

Primary Examiner — Binh V Ho

(57) ABSTRACT

A method and system for automatically managing changes to organizational data in a unified messaging (UM) platform are disclosed. A database snapshot is retrieved from a client human resources database. Added user information associated with a user is detected in the database snapshot, and an existing mailbox associated with the user in the UM platform is detected. Organizational data in the UM platform is automatically modified to combine the added user information and the existing mailbox in the UM platform. When the existing mailbox is detected in the UM platform for the user, it is possible for the UM platform to automatically compose and send a message to at least one user associated with the added user information including potential modifications of the organization data. The organizational data in the UM platform can then be modified in response to receiving approval of the potential modifications of the organizational data from at least one user associated with the added user information.

25 Claims, 6 Drawing Sheets

METHOD AND SYSTEM FOR MANAGING MULTIPLE INSTANCE SUBSCRIBER RECORDS IN UNIFIED MESSAGING SYSTEMS

BACKGROUND OF THE INVENTION

The present invention relates generally to provisioning organizational definitions and more particularly to provisioning organizational definitions in a unified messaging platform environment.

Unified messaging is the integration of multiple (typically two or more) types of communication (e.g., email, voicemail, short message service (SMS), fax, etc.) into a single, unified message store (e.g., a unified messaging platform) accessible from a variety of user devices. Unified messaging is typically provided by a service provider, which may be the same service provider that provides telephone service. In order for a service provider to provide unified messaging service to an organization of subscribers (also called users, which may be employees of a client organization), the unified messaging platform must be configured with organizational data regarding related groups in the client organization's organizational structure. Each client can be assigned his/her own unified messaging mailbox.

Conventionally, provisioning of business groups of a subscriber into the unified messaging platform is done manually using interactive software. Such software allows a client or the service provider to manually define organizational structures for the client organization in order to define mailboxes for individual users and to maintain group hierarchies in the client's organizational structure. Although this approach is effective, it requires the manual definitions of a client's organizations and groups into organizational data supported by the unified messaging platform. This can be tedious and error-prone. Moreover, manually defining such organizational data can take a long time and be operationally expensive, particularly for larger businesses and organizations. Accordingly, automatic definition of organizational data in a unified messaging platform is desirable.

A subscriber often does not desire to have multiple mailboxes, even if his/her name may appear in multiple places in the organization. A name may appear in more than one place in an organization's database due to a variety of reasons, such as, but not limited to, temporary acting positions and concurrent assignments in various groups (e.g., a temporary international assignment). Furthermore, even if desired, multiple mailboxes due to multiple instance subscriber records must be managed carefully and often manually. Such manual management is tedious, error-prone, and operationally expensive. Accordingly, automatic management of multiple instance subscriber records in a unified messaging platform is desirable.

BRIEF SUMMARY OF THE INVENTION

The present invention provides a method and system for automatically managing multiple instance user records in a unified messaging (UM) platform environment.

In one embodiment of the present invention, a database snapshot is retrieved from a client human resources database. Added user information associated with a user is detected in the database snapshot, and an existing mailbox associated with the user in the UM platform is detected. Organizational data in the UM platform is automatically modified to combine the added user information and the existing mailbox in the UM platform. When the existing mailbox is detected in the UM platform for the user, it is possible for the UM platform to automatically compose and send a message to at least one user associated with the added user information including potential modifications of the organization data. The organizational data in the UM platform can then be modified in response to receiving approval of the potential modifications of the organizational data from at least one authorized user associated with the added user information.

These and other advantages of the invention will be apparent to those of ordinary skill in the art by reference to the following detailed description and the accompanying drawings.

DETAILED DESCRIPTION

Embodiments of the present invention are directed to an enhanced unified messaging (UM) system, in which organization data corresponding to an organizational hierarchy of a client is automatically provisioned.

Figure 1:
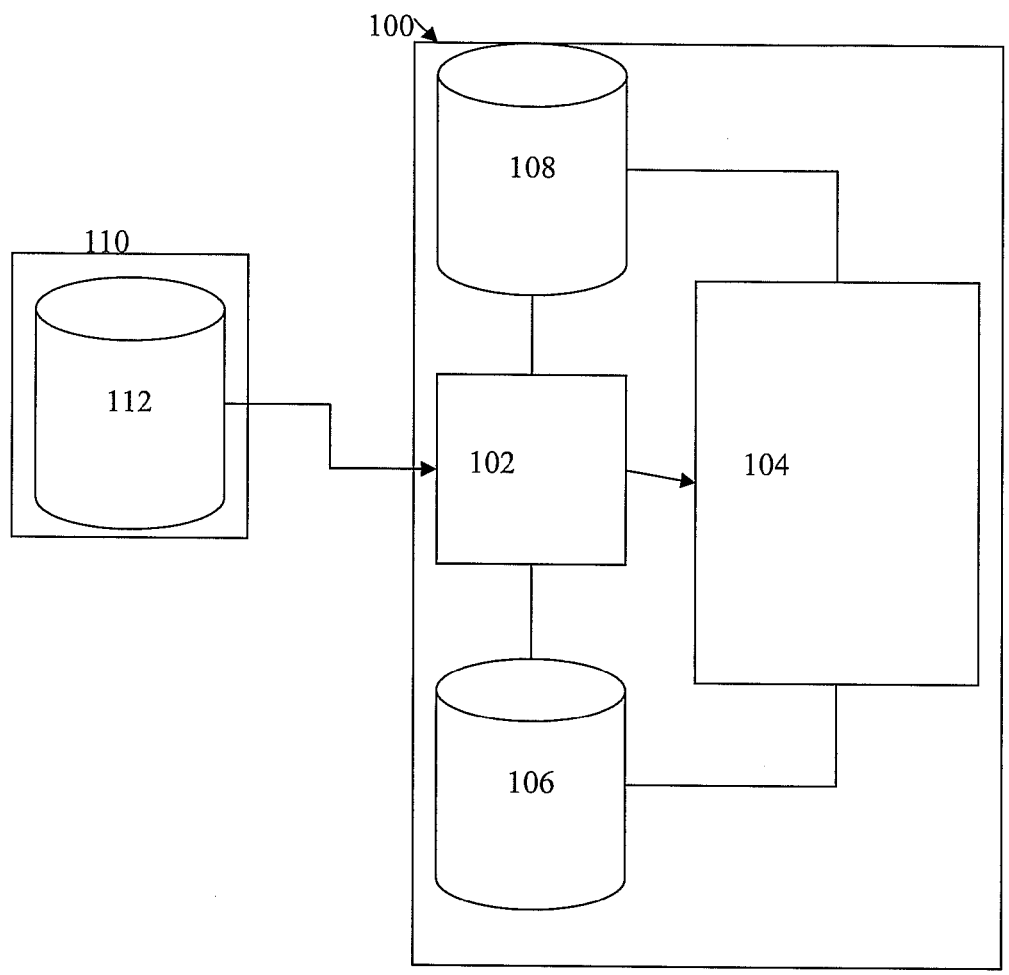
FIG. 1 illustrates a unified messaging system according to an embodiment of the present invention.

FIG. 1 illustrates a unified messaging system 100 according to an embodiment of the present invention. Unified messaging (UM) system 100 includes a UM platform 104 and a controller 102 (also called adapter 102) that automatically defines organizational data corresponding to an organizational structure of a customer (client) 110 in the UM platform 104. The controller 102 interfaces with the client's 110 logically organizational databases, such as human resources database 112. The human resources database 112 stores entries corresponding to users (e.g., employees) associated with the client 110. The entries of the human resources database 112 are logically organized hierarchically according to a hierarchical organizational structure of the client 110, and include human resources information associated with the users, such as name, telephone number (TN), geographical location, group membership, device specifications, alternate devices that may be used in find me follow me (FMFM) scenarios, etc. Human resources databases are often linked with, or used as or in conjunction with telephone databases. Accordingly, the term "human resources database" is used herein to cover all such cases.

The controller 102 retrieves the organizational hierarchy from the human resources database 112, and creates corresponding organizational data in the UM platform 104. For example, the controller 102 can create Intermediate Logic Nodes (ILNs) and Communities of Interest (COIs) corresponding to the organizational hierarchy of the human resources information stored in the human resources database 112. In the UM platform 104, a COI is group that shares one or more common attributes. For example, a group of employees located at a particular geographical branch of a business, or a group of employees who report to the same supervisor can be grouped into a COI. An ILN is an organizational designation for which there are one or more COIs. For example, an ILN of location can have multiple COIs, each COI corresponding to a particular geographical branch of a business. As another example, an ILN may be used to represent a branch location, and the COIs that are under that ILN may represent various departments in that location. It is to be understood, that the organizational structure of a particular organization or business can be organized according to various ILNs and COIs. An advantage of the UM system 100 of FIG. 1 is that the controller 102 automatically reflects the organizational structure of information stored in the human resources database 122 in the ILNs and COIs created for the UM platform 104.

The controller 102 can be implemented as a processor executing software instructions for defining the organizational data. The controller 102 can communicate with the UM platform 104 using a UM application programming interface (API). According to an advantageous embodiment, the controller 102 can communicate with the UM platform 104 using a previously existing API used for defining organizational data. Accordingly, the controller 102 can be seamlessly integrated into UM platforms already in use. The controller 102 can communicate with the human resources database 112 using an API (e.g., abstracted, LDAP or SQL-based) associated with the human resources database 112. According to a possible implementation, the controller 102 can be pre-designed to interface with the most common types of human resources databases, such as SAP, PeopleSoft, Intuit Payroll solutions, etc. According to another possible implementation, the controller 102 may be custom-designed for any other types of human resources database used by a particular client.

The UM platform 104 includes multiple UM mailboxes located at one or more messaging centers (MCs). The UM interface 104 includes one or more server or server-like devices that can be implemented as computers, such as the computer 200 discussed below with respect to FIG. 4. The MCs can be provided at various geographic locations. Each user of the UM platform 104 is assigned a mailbox. Mailboxes assigned to users grouped within a COI are assigned to the same MC. The UM platform 104 may be coupled to or include the controller 102 and/or a UM database 106. The UM platform 104 stores the organizational data, such as the ILNs and the COIs, created by the UM controller 102, into the UM database 106. The UM database 106 and service provider database 108 may be combined and be part of one database, and may also be integrated with the UM platform 104.

When the controller 102 derives the organizational data for the UM platform 104 corresponding to the human resources information in the human resources database 112, the UM platform 104 may automatically provision a mailbox for each user specified in the human resources information. The UM platform 104 assigns mailboxes associated with the users to MCs based on the COIs associated with the users, so that the UM mailboxes for all users associated with a COI are assigned to the same MC. In addition to the human resources information retrieved from the human resources database 112, the UM platform 104 can be provided with additional data from a service provider database 108 to influence the assignment of the COIs to various MCs. The service provider database 108 can be coupled to or included in the UM platform 104, or can be maintained by a service provider separately from the UM platform 104. The service provider database 108 can include information such as geographical locations of users, local access and transport area (LATA) definitions, call forwarding number (CFN) definitions, capacity constraints of existing UM MCs, etc. The UM platform 104 can utilize this information when assigning mailboxes of users associated with a COI to an MC.

Placements of logical organizational units (e.g., COIs) at MCs can be adjusted at any time. Illustratively, the following parameters can be provided by the UM platform 104 for automatic provisioning: (1) (NPA, NNX) tuple and the target MC name for mapping COIs to specific MCs. The mapping of the target MCs may be automatically conditioned on the capacity of available MCs, whereby a list of MCs is provided to overcome remaining capacity limitations; (2) CFN to MC mappings; and (3) Class of Service (COS) identification. It is to be understood that these parameters are exemplary, and other parameters may be provided as well.

The system of FIG. 1 can be implemented as a "turn key" operation with existing UM platforms to achieve virtually instantaneous group definitions and virtually no errors. Furthermore, the service provider can access the adaptor 102 and/or UM platform 104 in order to fine tune changes or modify group definitions. Programming and/or user interface access may also be given to the customer so that the customer can also modify or customize the group definitions.

Figure 2:
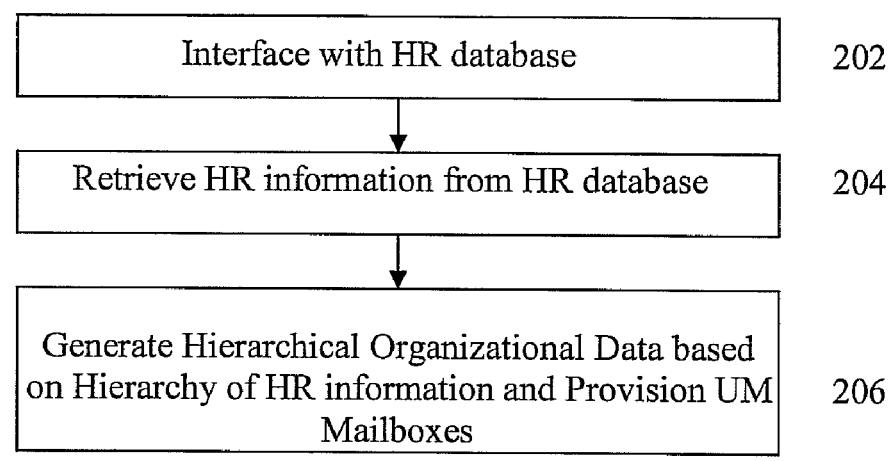
FIG. 2 illustrates a method for defining organizational data in a UM platform according to an embodiment of the present invention.

FIG. 2 illustrates a method 200 for defining organizational data in a UM platform according to an embodiment of the present invention. The method 200 of FIG. 2 automatically transforms human resources data representing entities (users) and an organizational structure of a business or organization into logical organizational units associated with the UM platform. As illustrated in FIG. 2, at step 202, a UM platform interfaces with a client's human resource (HR) database. For example, an adaptor of the UM platform can connect to or communicate with the HR database. When the adaptor is in communication with the HR database, these components can transmit signals and/or information to each other using any appropriate interfaces (e.g., SQL, LDAP, etc.) over any appropriate communication protocols. At step 204, the controller of the UM platform retrieves HR information organized in an organizational hierarchy from the HR database. At step 206, hierarchical organizational data is automatically generated in the UM platform based on the organizational hierarchy of the human resources information, and UM mailboxes are provisioned based on the hierarchical organizational data. For example, ILNs and COIs are automatically generated based on the organization structure of the human resources information. Mailboxes for users grouped in COIs are created and assigned to various MCs associated with the COIs.

Figure 3:
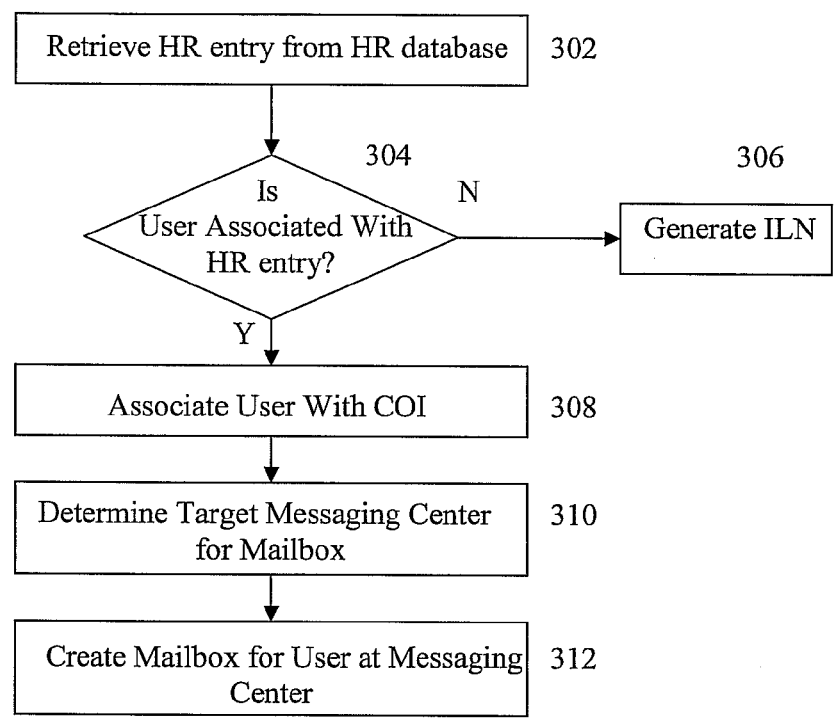
FIG. 3 illustrates a method for generating and provisioning hierarchical organizational data in a UM platform according to an embodiment of the present invention.

FIG. 3 illustrates a method 300 for generating and provisioning hierarchical organizational data in a UM platform according to an embodiment of the present invention. The method 300 of FIG. 3 can be used to implement steps 204 and 206 of the method of FIG. 2. The method 300 of FIG. 3 processes the HR information from the HR database entry by entry to generate organizational data corresponding to each entry in the UM platform. As illustrated in FIG. 3, at step 302, an HR entry is retrieved from the HR database. At step 304, it is determined whether a user (i.e., person) is associated with the HR entry. If there is no user associated with the HR entry, the method proceeds to step 306. If there is a user associated with the HR entry, the method proceeds to step 308.

At step 306, if there is no user associated with the HR entry, an ILN corresponding to the entry is generated. If there is no user associated with the entry, the entry represents an organizational entity, not an individual. An ILN representing the entity is generated and the name is used as the name of the ILN in the UM platform. The ILN may be created in all of the MCs of the UM platform without any associated mailboxes (as metadata, since mailboxes are associated with COIs). After the ILN is generated, the method proceeds to the next HR entry.

At step 308, if there is a user associated with the HR entry, the user (the HR entry) may be associated with a COI node. In particular, if a COI node does not yet exist for this organizational level, the COI node is created. Other users at the same organizational level may then be assigned to this COI node. If the appropriate COI node already exists, the user may be associated with the existing COI node.

At step 310, a target MC is determined for a user mailbox. At step 312, a mailbox may be created for the user at the determined MC. A configured UM input parameter can be used to assign he mailbox to a given MC. For example, the UM platform may provide the following data to controller: (NPA, NNX)→MC name, LATA. Accordingly, based on the NPA and NNX of the TN associated with the user, the controller assigns the user to a particular MC and LATA. If a capacity constraint of a configured MC is above a certain threshold, a list of other MCs in the LATA can be provided by the UM platform, and another configured MC can be used. This fact and the result of the operation are communicated to the UM platform. The MC name of the MC to which the mailbox is assigned can be used to drive the Call Forwarding Number (CFN) information for that MC. Accordingly, a CFN associated with the mailbox can be determined based on the assigned MC. The mailbox can be created for the user with the primary contact number of the user as the key to the mailbox creation (i.e., resulting in a Web Services API call createMailbox(TN, CFA, LATA, COS, . . . )). The user's name is mapped to the subscriber of that mailbox. Alternate device information may be, optionally, incorporated into the mailbox definition (e.g., for UM FMFM service).

As described above, the method of FIG. 3 generates and provisions organizational data in the UM platform corresponding to an HR entry. The method is repeated for all HR entries in the HR database. Accordingly, the graph (e.g., tree) of HR entries are automatically mapped into ILN and COI nodes in the UM platform by the controller using predefined mappings provided by the UM platform. These template production rules can be customized for each organization. Schemas of HR databases are generally unique to each vendor, and maybe different for each business. Hence, column names, for example, may be unique for each business customer, while particular column names may or may not be the same as other customers of the same database vendor.

Although enterprise mailboxes in the UM platform can be initially provisioned in bulk mode, as described above, conventional procedures do not allow for automated, auditable and confirmed flow-through changes to the UM mailboxes of the assigned users. Embodiments of the present invention provide automatic, flow-through management of changes to the organization data of the UM platform. In particular, embodiments of the present invention manage change in the organizational data of the UM platform in response to changes in the human resources data in a human resources database. For example, examples of such changes can include additions, suspensions, deletions, and device changes for users (e.g., employees) of an enterprise (client).

Automatic change management can be implemented using the enhanced UM system 100 of FIG. 1. Returning to FIG. 1, the controller 102, which can be coupled to and/or part of the UM platform 104, can function as an organizational change management module that manages changes to the operational data of the UM platform 104 that is stored in the UM database 106. The controller 102 retrieves human resources information from the human resources database 112 and detects changes from previous human resources information. The controller 102 can modify the organizational data of the UM platform 104 in order to reflect the detected changes.

Figure 4:
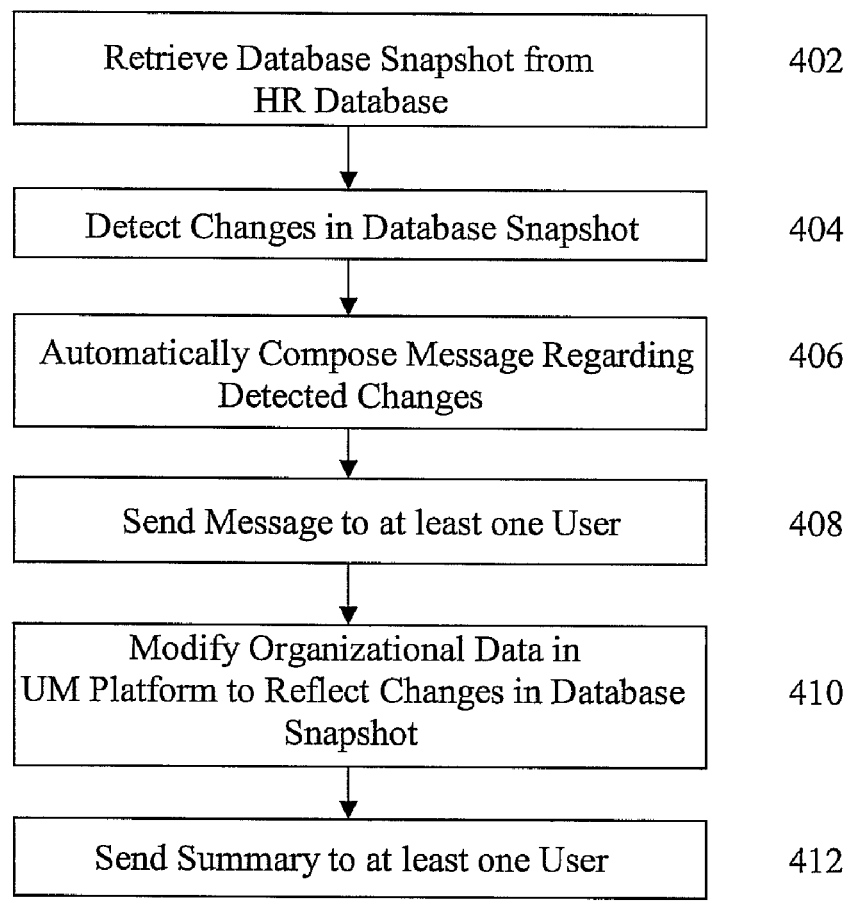
FIG. 4 illustrates a method for managing changes to organizational data in a UM platform according to an embodiment of the present invention.

FIG. 4 illustrates a method 400 for managing changes to organizational data in a UM platform according to en embodiment of the present invention. The method 400 of FIG. 4 transforms human resources data in the human resources database representing various users and/or devices into organizational data in the UM platform.

Referring to FIG. 4, at step 402 a database snapshot is retrieved from the human resources (HR) database. As used herein, the term "database snapshot" refers to all or a portion of the information stored in a database at a given time. According to a possible implementation, the database snapshot of the HR database may be retrieved at a regular time interval, such as nightly. According to another possible implementation, the database snapshot may be retrieved "on demand" in response to an instruction from a user to retrieve the snapshot data. According to yet another possible implementation, the database snapshot may be retrieved in response to a trigger in the HR database. In this situation, predefined types of changes in the HR database trigger predefined types of changes in the UM organizational data. When a change is made in the HR database, an alert is sent to the UM platform. The HR database snapshot is retrieved from the HR database in response receiving the alert.

At step 404, changes in the HR database snapshot from a previous HR database snapshot are detected. The changes in the HR database snapshot are detected by comparing the database snapshot to the previous database snapshot. The comparison may be performed on a whole database (e.g., in the case of periodic or on demand executions) or only on the changed records (e.g., in the case of the UM platform receiving trigger notifications from the HR database regarding specific change records). In an alternate implementation, changes can be detected by generating UM organizational data corresponding to the HR database snapshot and comparing this data to previously generated UM organizational data corresponding to the previous HR database snapshot.

At step 406, a message may be automatically composed regarding each detected change. The message is dynamically generated and includes information regarding the detected changes, the affected individual (user), the status associated with the affected user, (e.g., deleted, suspended, newly created), and proposed or potential changes to the organizational data in the UM platform corresponding to the detected changes.

At step 408, the message is sent to at least one user associated with the detected change. For example, the message can be sent to any or all of the affected user, a supervisor of the affected user, and an assigned customer contact (e.g., Human Resources representative). The message can provide a user with the options of accept, reject, or ignore. According to a possible implementation, the message can be sent using outdial Interactive Voice Response (IVR). According to another possible implementation, the message can be sent as an email with randomized hyperlinks for each action (accept, reject, and ignore). A user receiving the message can accept, reject, or ignore the proposed changes to the UM organizational data. If the user selects "ignore", it is possible for that the potential modifications to the UM organizational data be kept in a pending state. It is also possible that "ignore" is treated as a default acceptance or rejection according to a client preference. It is also possible that the UM platform 104 treats a lack of receipt of a response to such an inquiry as ignore, accept or reject, as the UM platform 104 may be configured. It is also possible to combine such change-notification messages regarding more than one subscriber into each such client message (e-mail, IVR, etc.). Each client response may be in the form of a Uniform Resource Locator (URL) link activation, a web-based interface, and IVR response, or any other appropriate method.

At step 410, the organizational data of the UM platform may be automatically modified to reflect the detected changes in the database snapshot, in response to receiving approval from at least one authorized user associated with the detected change, or by defaulting to such an acceptance state. The organizational data of the UM platform can be modified using UM application programming interfaces (API) that reflect changes to the records of the HR database. High-level examples of customer enterprise (HR) database changes and associated UM APIs are shown in Table 1 below:

TABLE 1

| DB Changes | Triggered UM API Functions |
| --- | --- |
| Employee added | createMailbox(TN, . . . ) |
| Employee device changed | a) deletedDevice(mailboxID, TN, . . . ), if previous device is no longer there, and<br>b) addDevice( ), if new device is added |
| Employee deleted | deleteMailbox(mailboxID, . . . ) |
| Employee status changed to "suspended" | disableMailbox (mailboxID, . . . ) |

As shown in Table 1, when an employee (user) is added to the HR database, the organizational data in the UM platform is modified by creating mailbox. The employee's telephone number (TN) his/her phone device can be used in the identification of the corresponding mailbox. When a device is no longer in the HR database, the device is deleted from the organizational data in the UM platform. When a new device is added to the HR database, the device is added to the organizational data of the UM platform. When an employee is deleted from the HR database, the corresponding mailbox is deleted from the organizational data in the HR platform. When an employee is suspended, the employee's mailbox is disabled in organizational data of the HR platform. It is to be understood that the UM API functions show in Table 1 are exemplary, and other existing and/or new API functions can also be used to modify the organizational data of the UM platform.

At step 412, a summary of the modifications to the organizational data in the UM platform may be sent to at least one authorized user associated with the changes. For example, the summary can be sent to one or more authorized client contacts. The summary can be sent via out-dial IVR or as an email or any other appropriate mechanism. The UM platform 104 may also send a message to the affected user about the specific change(s) to his/her mailbox, depending on the nature of the change and configuration of the UM system.

As described above in steps 406-410, in an embodiment of the present invention, a message regarding the detected changes is automatically composed and sent, and the UM organizational data is modified to reflect the detected changes in response to receiving an approval or after expiration of a time period without receiving an approval. According to another embodiment of the present invention, it is possible to automatically modify the organizational data in the UM platform to reflect the detected changes without attempting to obtain user approval. In this case, the UM organizational data can be modified without first composing and sending a message regarding the detected changes. The summary of the changes can then be sent to at least one user associated with the changes in order to alert one or more authorized individuals (possibly including the user) of the modifications made to the UM organizational data.

The above described embodiments of the present invention can be used to automate initial and subsequent provisioning or organizational mailboxes in the UM platform. However, these methods can result in multiple mailboxes being created for any user (subscriber), based on the number of instances that the user's name appears in the client's HR or phone databases. The resulting UM organizational data can assign the user one or more new mailboxes, where a user already has mailbox on the UM platform. Further, the user can have existing devices (e.g., mobile and/or office phones), each of which is already linked to an existing mailbox. These undesirable scenarios are considered errors from subscribers' and clients' standpoints.

The above errors can occur when a user exists in different COIs in the UM organizational data. This can happen, for example, when a user's information appears in different departments in the client enterprise. One example of multiple instances of such data in a client HR DB is when an employee is a manager, and his name appears in one or more higher department records (e.g., his supervisor's department) as well as in the department he manages. Another example is when an employee is on assignment from one department to another (e.g., on an international assignment). It is to be understood that multiple instances of user data in the HR DB are not limited to these examples.

There are various deficiencies and problems with regards to multiply-created mailboxes for the same user in the UM platform. For example, the user is forced to inconveniently use more than one mailbox (for each mailbox automatically created) to check and retrieve his messages. When a user checks different mailboxes using device numbers, the user may not recall or know the associations of devices to mailboxes and may miss some mailboxes or visit some mailboxes multiple times. When the user checks different mailboxes using device numbers, the user may incur unnecessary toll charges. A user who uses access numbers would have to inconveniently dial different and multiple UM access numbers (e.g., one number for each message center (MC), if the mailboxes are mapped onto different MCs), thereby also possibly incurring unnecessary toll charges. In particular, this scenario is likely and troublesome, if the user's name appears in different geographic locations (e.g., in different branches internationally) in the HR DB, since different MCs are typically used for geographically separate device TNs such as those for users on international assignments. A user would have to manually remember all of his mailboxes to manually delete the extra mailboxes and migrate their devices to a target selected mailbox. This is often a difficult task for a user, is error-prone and may require further manual and expensive administrative support.

Manual corrections to the aforementioned problems involve manual deletion of the duplicate mailboxes, migration (re-associations) of devices from deleted mailboxes to a single target mailbox, and migration of messages from deleted mailboxes to the single target mailbox. If a device has been deleted from one HR record and appeared in another, then conventionally, a manual procedure would be necessary to migrate that device from one mailbox to another. Such manual procedures are error-prone and tedious, operationally expensive, and not easily tracked for audit or problem determination purposes.

Automatic management of multiple instance user data can be implemented using the enhanced UM system 100 of FIG. 1. Returning to FIG. 1, the controller 102, which can be coupled to and/or part of the UM platform 104, can function as an organizational change management module that manages changes to the operational data of the UM platform 104 that is stored in the UM database 106 and detects and resolves multiple mailboxes created for a single user. The controller 102 retrieves human resources information from the human resources database 112 and detects additions from previous human resources information. The controller 102 detects when and addition corresponds to an individual with an existing mailbox and modifies the organizational data of the UM platform 104 in order to combine the multiple mailboxes for the user.

Figure 5:
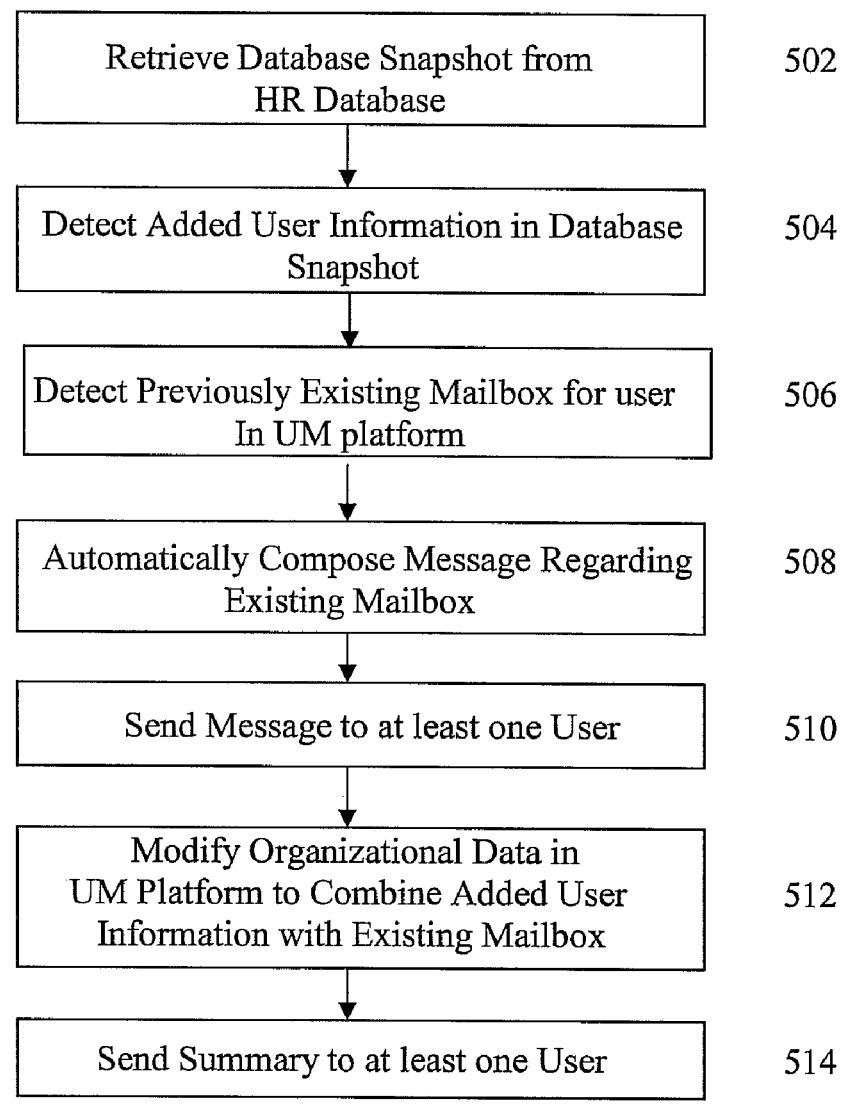
FIG. 5 illustrates a method for managing multiple instances of user information in a UM platform according to an embodiment of the present invention.

FIG. 5 illustrates a method 500 for managing multiple instances of user information in a UM platform according to an embodiment of the present invention. The method 500 of FIG. 5 transforms human resources data in the human resources database representing various users and/or devices into organizational data in the UM platform.

Referring to FIG. 5, at step 502 a database snapshot is retrieved from the human resources (HR) database. According to a possible implementation, the database snapshot of the HR database may be retrieved at a regular time interval, such as nightly. According to another possible implementation, the database snapshot may be retrieved "on demand" in response to an instruction from a user to retrieve the snapshot data. According to yet another possible implementation, the database snapshot may be retrieved in response to a trigger in the HR database. In this situation, predefined types of changes in the HR database trigger predefined types of changes in the UM organizational data. When a change is made in the HR database, an alert is sent to the UM platform. The HR database snapshot is retrieved from the HR database in response receiving the alert.

At step 504, added user information in the database snapshot is detected. Added user information in the HR database snapshot is detected by comparing the database snapshot to the previous database snapshot. The comparison may be performed on a whole database (e.g., in the case of periodic or on demand executions) or only on the changed records (e.g., in the case of the UM platform receiving trigger notifications from the HR database regarding specific change records). In an alternate implementation, the added user information can be detected by generating UM organizational data corresponding to the HR database snapshot and comparing this data to previously generated UM organizational data corresponding to the previous HR database snapshot.

At step 506 one or more existing mailboxes may be detected in the UM platform for the user associated with the added user information. When added user information is detected in the database snapshot for a user, the existing mailboxes on the UM platform are searched to determine whether an existing mailbox (or multiple existing mailboxes) exists for the user on the UM platform. According to a possible implementation, all of the organizational data associated with the particular client (e.g., enterprise or business) in the UM platform is searched for existing mailboxes associated with the user. According to another possible implementation, the scope of the search may be expanded to include mailboxes outside of the particular client, subject to the organizations' approval.

At step 508, a message is automatically composed regarding the one or more detected existing mailboxes for the user. The message is dynamically generated and includes information regarding the affected individual (user), the added user information, and the existing mailbox(es) in the UM platform. If one or more existing mailboxes are detected for the user, the existing mailboxes can be listed in the message. For example, the message can be an email with HTML application server links back to the UM platform (using randomized URLs), and each mailbox and device can be designated with HTML selection buttons. For each listed existing mailbox, an option is provided in the message to add newly-found devices, if any, associated with the added HR information, to any of the existing mailboxes or the single existing mailbox. The message may also include proposed changes to the organizational data in the UM platform, such as an automatically generated default association of a new device (e.g., TN) in the added HR information with an existing mailbox.

At step 510, the message is sent to at least one user associated the added user information. For example, the message can be sent to any or all of the affected user, a supervisor of the affected user, and an assigned customer contact. The message can provide a recipient with the options of accept, reject, or ignore proposed changes in the message. The message can also allow the recipient to select which of multiple existing mailboxes with which to associate the new device information. According to a possible implementation, the message can be sent using out-dial Interactive Voice Response (IVR). According to another possible implementation, the message can be sent as an email with randomized hyperlinks for each action (accept, reject, and ignore). A recipient of the message can accept, reject, or ignore the proposed changes to the UM organizational data, or specify specific changes to the UM organizational data. If the user selects "ignore", it is possible for that the proposed modifications to the UM organizational data be kept in a pending state. It is also possible that "ignore" is treated as a default acceptance or rejection according to a client preference. If the user selects "reject", it is possible for the user to allow another mailbox to be created in the UM platform. Furthermore, it is possible to configure UM platform 104 and/or controller 102 to give preference to the responders, in case conflicting responses are received. In another implementation, in case of multiple conflicting responses, the transactions are referred for manual administration. In yet another embodiment, only one recipient is considered authorized, and other purely informational messages may not include provisions for responses.

At step 512, the organizational data of the UM platform is automatically modified to combine the added user information with the existing mailbox, in response to receiving approval from at least one user associated with the added user information. For example, based on a user response to the message, the organizational data in the UM platform can be changed to associate a new device in the added user data with a previously existing mailbox for the user. The organizational data can also be changed to migrating devices from a previously existing mailbox to a newly created mailbox. The organizational data of the UM platform can be modified using UM application programming interfaces (API) that reflect changes to the records of the HR database. Examples of customer enterprise (HR) database changes and associated UM APIs are shown in Table 1 above. It is possible that the deleteDevice(mailboxID, TN, . . . ) API calls are made prior to the addDevice( ) calls in order to assist in automatic migrations of devices from one mailbox to another.

At step 514, a summary of the modifications to the organizational data in the UM platform is sent to at least one user associated with the changes. For example, the summary can be sent to the affected user and/or assigned customer contacts. The summary can be sent via out-dial IVR or as an email or using any other appropriate mechanism.

As described above in steps 408-412, in an embodiment of the present invention, a message regarding the existing mailbox is automatically composed and sent, and the UM organizational data is modified to combine the added user information with the existing mailbox in response to receiving an approval. According to another embodiment of the present invention, it is possible to automatically modify the organizational data in the UM platform to combine the added user information with the existing mailbox without obtaining user approval. In this case, the UM organizational data can be modified without first composing and sending a message regarding the modifications. The summary of the changes can then be sent to at least one user associated with the changes in order to alert the user of the modifications made to the UM organizational data.

The embodiments of the present invention described above provide methods for managing changes to organizational data in the UM platform and managing multiple instance user records in the UM platform that eliminate significant recurring costs, provide an audit trail of activities, implement a configurable approval mechanism by zero or more configurable parties, and provide a virtually error free flow-through scheme.

Figure 6:
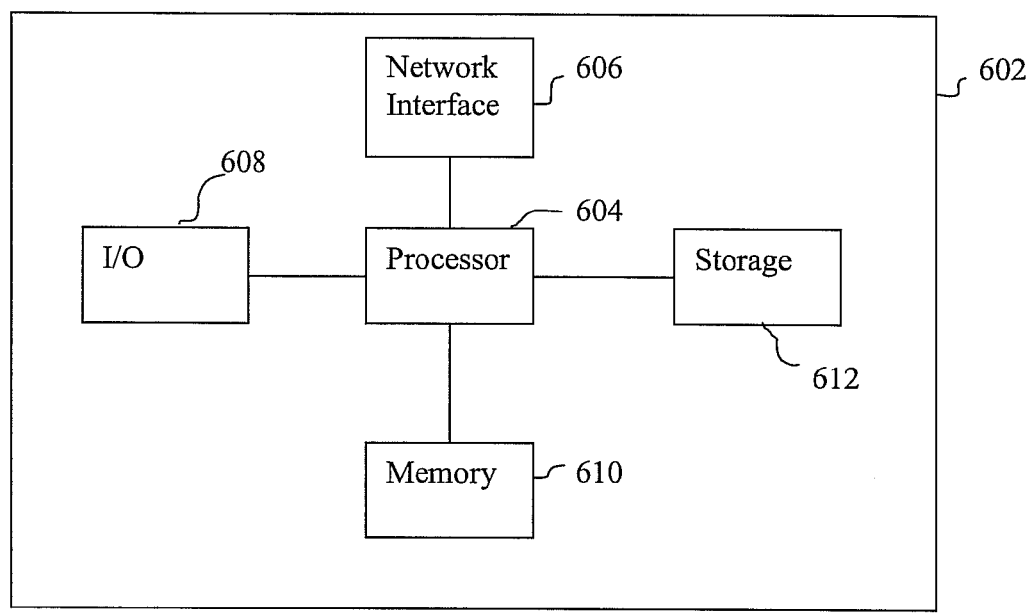
FIG. 6 is a high level block diagram of a computer capable of implementing the present invention.

The above described methods for defining and provisioning organizational data in a UM platform, managing changes to organizational data in a UM platform, and managing multiple instance user records in a UM platform can be implemented on a computer using well-known computer processors, memory units, storage devices, computer software, and other components. A high-level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium (e.g., magnetic disk, CD ROM, etc.), and loaded into memory 610 when execution of the computer program instructions is desired. Thus, the method steps of FIGS. 2, 3, and 4 can be defined by the computer program instructions stored in the memory 610 and/or storage 612 and controlled by the processor 604 executing the computer program instructions. For example, the computer program instructions can be implemented as computer executable code programmed by one skilled in the art to perform an algorithm defined by the method steps of FIGS. 2, 3, 4, and 5. Accordingly, by executing the computer program instructions, the processor 604 executes an algorithm defined by the method steps of FIGS. 2, 3, and 4. The computer 602 also includes one or more network interfaces 606 for communicating with other devices via a network. The computer 602 also includes input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention. The various functional modules that are shown are for illustrative purposes only, and may be combined, rearranged and/or otherwise modified.

What is claimed is:

1. A method for automatically managing multiple instance user records in a Unified Messaging (UM) platform, comprising:
retrieving a database snapshot from a client human resources database, the database snapshot including human resources information organized in an organizational hierarchy;
detecting added user information associated with a user in the database snapshot;
detecting an existing mailbox in the UM platform associated with the user; and
automatically modifying organizational data in the UM platform to combine the added user information with the existing mailbox in the UM platform,
wherein automatically modifying organizational data in the UM platform to combine the added user information with the existing mailbox in the UM platform comprises:
automatically composing a message regarding the added user information and the existing mailbox associated with the user;
sending the message to the user associated with the added user information; and
modifying the organizational data in the UM platform to combine the organizational data in response to receiving a user response from the user.

2. The method of claim 1, wherein retrieving a database snapshot comprises:
retrieving a database snapshot from the client human resources database at a regular time interval.

3. The method of claim 1, wherein retrieving a database snapshot comprises:
receiving an alert from the client human resources database in response to a database trigger; and
retrieving the database snapshot from the client human resources database in response to the alert.

4. The method of claim 1, wherein detecting added user information associated with a user in the database snapshot comprises:
comparing the database snapshot with a previous database snapshot.

5. The method of claim 1, wherein detecting an existing mailbox in the UM platform associated with the user comprises:
searching the organizational data in the UM platform for an existing mailbox associated with the user.

6. The method of claim 1, wherein the message comprises potential modifications of the organizational data in the UM platform, and the user response is an approval of the potential modifications of the organizational data in the UM platform.

7. The method of claim 1, wherein the message comprises a list of multiple existing mailboxes associated with the user, and the user response comprises a selection of which of the existing mailboxes with which to associate the added user information.

8. The method of claim 1, wherein the user comprises one of a user affected by the added user information, a supervisor of the user affected by the added user information, and an assigned customer contact.

9. The method of claim 1, wherein sending the message to the user associated with the added user information comprises:
sending the message via one of out-dial Interactive Voice Response (IVR) and an email with randomized hyperlinks.

10. The method of claim 1, further comprising:
automatically sending a summary of the modified organizational data in the UM platform to the user associated with the detected added user information.

11. The method of claim 1, wherein automatically modifying organizational data in the UM platform to combine the added user information with the existing mailbox in the UM platform further comprises:
modifying the organizational data in the UM platform to associate a device in the added user information with the existing mailbox in the UM platform.

12. A system for automatically managing multiple instance user records in a Unified Messaging (UM) platform, comprising:
means for retrieving a database snapshot from a client human resources database, the database snapshot including human resources information organized in an organizational hierarchy;
means for detecting added user information associated with a user in the database snapshot;
means for detecting an existing mailbox in the UM platform associated with the user; and
means for automatically modifying organizational data in the UM platform to combine the added user information with the existing mailbox in the UM platform,
wherein the means for automatically modifying organizational data in the UM platform to combine the added user information with the existing mailbox in the UM platform comprises:
means for automatically composing a message regarding the added user information and the existing mailbox associated with the user;
means for sending the message to the user associated with the added user information; and
means for modifying the organizational data in the UM platform to combine the organizational data in response to receiving a user response from the user.

13. The system of claim 12, wherein the means for detecting added user information associated with a user in the database snapshot comprises:
means for comparing the database snapshot with a previous database snapshot.

14. The system of claim 12, wherein the means for detecting an existing mailbox in the UM platform associated with the user comprises:
means for searching the organizational data in the UM platform for an existing mailbox associated with the user.

15. The system of claim 12, wherein the message comprises potential modifications of the organizational data in the UM platform, and the user response is an approval of the potential modifications of the organizational data in the UM platform.

16. The system of claim 12, wherein the message comprises a list of multiple existing mailboxes associated with the user, and the user response comprises a selection of which of the existing mailboxes with which to associate the added user information.

17. The system of claim 12, further comprising:
means for automatically sending a summary of the modified organizational data in the UM platform to the user associated with the detected added user information.

18. The system of claim 12, wherein the means for automatically modifying organizational data in the UM platform to combine the added user information with the existing mailbox in the UM platform further comprises:
means for modifying the organizational data in the UM platform to associate a device in the added user information with the existing mailbox in the UM platform.

19. A non-transitory computer readable medium encoded with computer executable instructions for automatically managing multiple instance user records in a Unified Messaging (UM) platform, the computer executable instructions defining a method comprising:
retrieving a database snapshot from a client human resources database, the database snapshot including human resources information organized in an organizational hierarchy;
detecting added user information associated with a user in the database snapshot;
detecting an existing mailbox in the UM platform associated with the user; and
automatically modifying organizational data in the UM platform to combine the added user information with the existing mailbox in the UM platform,
wherein the computer executable instructions defining automatically modifying organizational data in the UM platform to combine the added user information with the existing mailbox in the UM platform comprise computer executable instructions defining:
automatically composing a message regarding the added user information and the existing mailbox associated with the user;
sending the message to the user associated with the added user information; and
modifying the organizational data in the UM platform to combine the organizational data in response to receiving a user response from the user.

20. The non-transitory computer readable medium of claim 19, wherein the computer executable instructions defining detecting added user information associated with a user in the database snapshot comprise computer executable instructions defining:
comparing the database snapshot with a previous database snapshot.

21. The non-transitory computer readable medium of claim 19, wherein the computer executable instructions defining detecting an existing mailbox in the UM platform associated with the user comprise computer executable instructions defining:
searching the organizational data in the UM platform for an existing mailbox associated with the user.

22. The non-transitory computer readable medium of claim 19, wherein the message comprises potential modifications of the organizational data in the UM platform, and the user response is an approval of the potential modifications of the organizational data in the UM platform.

23. The non-transitory computer readable medium of claim 19, wherein the message comprises a list of multiple existing mailboxes associated with the user, and the user response comprises a selection of which of the existing mailboxes with which to associate the added user information.

24. The non-transitory computer readable medium of claim 19, further comprising computer executable instructions defining:

automatically sending a summary of the modified organizational data in the UM platform to the user associated with the detected added user information.

25. The non-transitory computer readable medium of claim 19, wherein the computer executable instructions defining automatically modifying organizational data in the UM platform to combine the added user information with the existing mailbox in the UM platform further comprise computer executable instructions defining:

modifying the organizational data in the UM platform to associate a device in the added user information with the existing mailbox in the UM platform.

\* \* \* \* \*